United States Patent [19]
Lee, Jr. et al.

[11] Patent Number: 5,428,351
[45] Date of Patent: Jun. 27, 1995

[54] METHOD AND APPARATUS FOR SHARING PASSWORDS

[75] Inventors: Robert E. Lee, Jr., Dover, N.H.; Kevin P. Grogan, South Berwick, Me.; Mark J. Plis, Barrington, N.H.

[73] Assignee: General Electric Company, Schenectady, N.Y.

[21] Appl. No.: 998,064

[22] Filed: Dec. 28, 1992

[51] Int. Cl.⁶ .............................................. G08C 19/16
[52] U.S. Cl. ........................... 340/870.02; 340/825.54; 340/310.01
[58] Field of Search .......... 340/310 A, 310 R, 870.02, 340/870.03, 525.54; 324/157

[56] References Cited

U.S. PATENT DOCUMENTS

| | | | |
|---|---|---|---|
| 3,702,460 | 11/1972 | Blose | 340/150 |
| 4,190,800 | 2/1980 | Kelly, Jr. et al. | 325/37 |
| 4,283,772 | 8/1981 | Johnston | 364/900 |
| 4,291,375 | 9/1981 | Wolf | 364/483 |
| 4,393,501 | 7/1983 | Kellog et al. | 371/33 |
| 4,465,970 | 8/1984 | DiMassimo et al. | 324/116 |
| 4,491,791 | 1/1985 | Balch et al. | 324/157 |
| 4,491,792 | 1/1985 | Bullock et al. | 324/157 |
| 4,491,793 | 1/1985 | Germer et al. | 324/157 |
| 4,571,692 | 2/1986 | Germer | 364/483 |
| 4,692,761 | 9/1987 | Robinton | 340/825.01 |
| 4,697,182 | 9/1987 | Swanson | 340/870.02 |
| 4,749,992 | 6/1988 | Fitzemeyer et al. | 340/870.02 |
| 5,059,896 | 10/1991 | Germer et al. | 324/142 |
| 5,268,666 | 12/1993 | Michel et al. | 340/310 R |

OTHER PUBLICATIONS

Engineering Presentation to AEIC/EEI Meter and Service Committees, Apr. 8, 1991 (pp. 1-14).
Engineering Presentation to AEIC/EEI Meter and Service Committees, Sep. 9, 1991 (pp. 1-5).
UCNet System Brochure Sep. 1991.
Utility Context Part B Standard Protocol Tables May 12, 1992 (p. 69, Table 40, 94-97).
Standard Meter Reading Protocol, GEI-52556 Nov. 1991.
Extended Meter Reading Protocol, Dec. 4, 1992.
Optocom-2 Protocol, GEI-52558, Dec. 27, 1991.
Optocom-2 Protocol, Appendix A: UCNet Phase 3, Dec. 9, 1992.
U.S. Patent Application Serial No. 07/968,959, filed Oct. 30, 1992, Apparatus for Retaining Data in a System for Remotely Reading Meters.
U.S. Patent Application Serial No. 07/968,958, filed Oct. 30, 1992, Apparatus for Temporarily Interrupting Tou and Load Control Schedules.

Primary Examiner—James J. Groody
Assistant Examiner—Glenton B. Burgess
Attorney, Agent, or Firm—Bell, Seltzer, Park & Gibson

[57] ABSTRACT

The method and apparatus for sharing passwords includes an electronic meter comprising a metering unit, a register unit, an optical port, and a communications unit. An external reading device, such as a handheld reading device or a personal computer, is coupled to the communication board via the optical port. The method and apparatus for sharing passwords provides that both the meter register and the communications unit have the same security code. In addition, the communications unit is able to distinguish between a security code for the communications unit and a security code for the meter register, and the communications unit will not interfere with communications between the external reading device and the meter register.

15 Claims, 6 Drawing Sheets

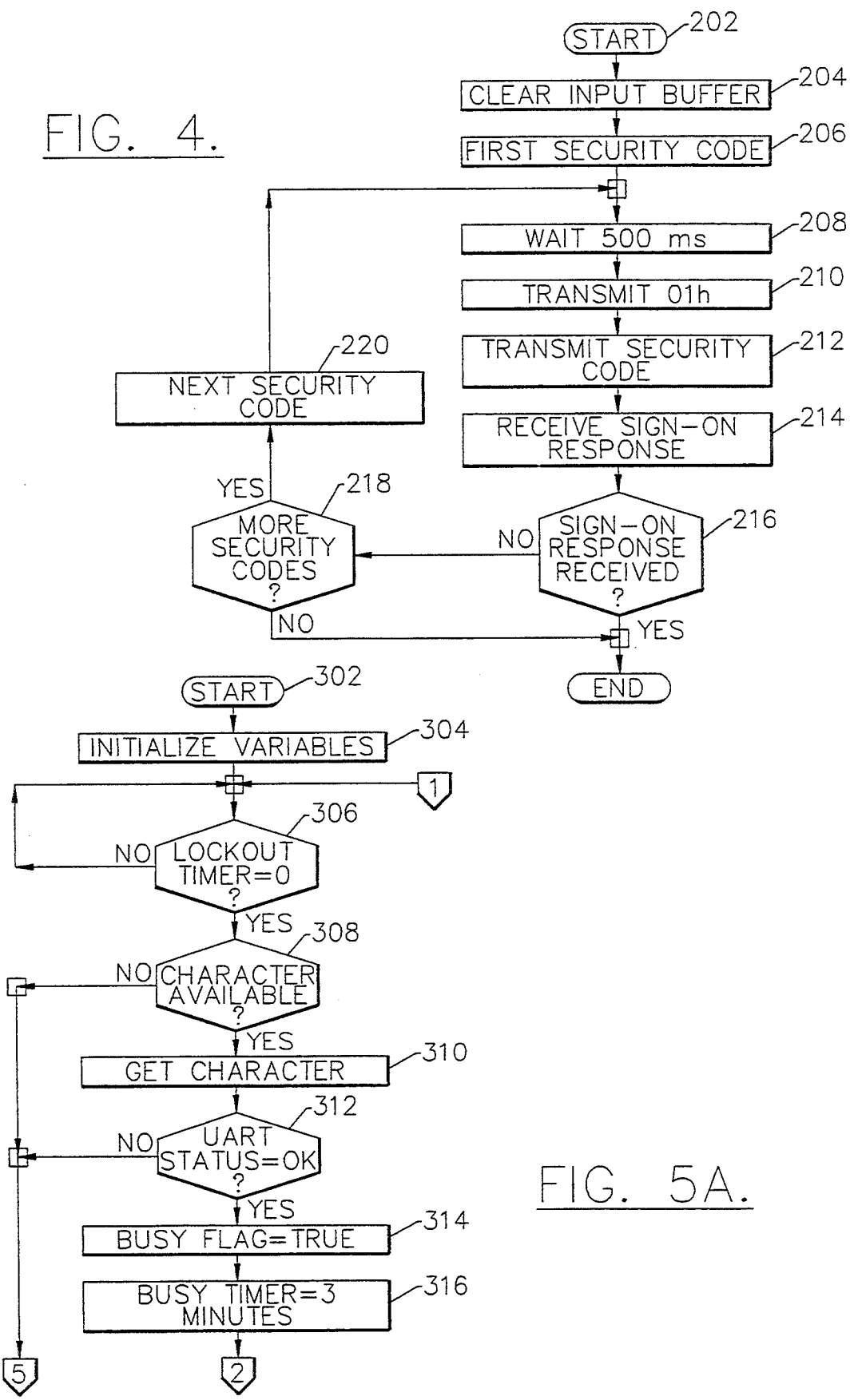

METHOD AND APPARATUS FOR SHARING PASSWORDS

BACKGROUND OF THE INVENTION

1. Field of the Invention

The present invention is generally related to meters, and more specifically, relates to a method and apparatus for providing security access for a communications board forming part of an energy meter.

2. Related Art

Electronic meters comprising energy registers and optical communications ports are well known in the art. Examples of reading/programming apparatus for reading information from and programming operation of electronic meter registers are set forth in U.S. Pat. Nos. 4,393,501, 4,491,791, 4,491,792 ; and 4,491,793. Examples of electronic registers are set forth in U.S. Pat. Nos. 4,571,692 and 4,465,970. Examples of electronic meters are set forth in U.S. Pat. No. 5,059,896.

Meter registers typically have a security code associated therewith. The security code, for example, is a predesignated number stored in the meter register memory. When a user tries to access the meter register data, the user must first transmit the proper security code. Upon receipt of a security code, e.g., a unique 80 bit code, the transmitted code is compared to the code stored in the register memory. If the transmitted and stored code match, the meter register will begin communications. If an invalid security code is received, the meter register will not communicate.

With the addition of a power line communications unit to an energy meter, it would be desirable to provide that both the communications unit and the meter register have the same security code. However, the register and communications unit must be able to distinguish between communications intended for the register and communications intended for the communication unit.

SUMMARY OF THE INVENTION

The present invention, in one embodiment, is an algorithm to be utilized in connection with an electronic meter comprising a metering unit, a register unit, an optical port, and a communications unit. An external reading device, such as a handheld reading device or a personal computer, is coupled to the communication board via the optical port.

The present algorithm provides that both the meter register and the communications unit have the same security code. In addition, the communications unit is able to distinguish between a security code for the communications unit and a security code for the meter register, and the communications unit will not interfere with communications between the external reading device and the meter register.

BRIEF DESCRIPTION OF THE DRAWINGS

These and other objects of the present invention, together with further features and advantages thereof, will become apparent from the following detailed specification when read together with the accompanying drawings, in which:

FIG. 4 is a flow chart illustrating one embodiment of a sequence of process steps to be executed, in accordance with the present invention, by a reading device;

FIGS. 5A-C are a flow chart illustrating one embodiment of a sequence of process steps to be executed, in accordance with the present invention, by a communication unit forming part of an energy meter.

DETAILED DESCRIPTION OF THE DRAWINGS

The present invention is directed specifically to an algorithm, partially implemented in a meter register forming part of an energy meter and partially implemented in a device (e.g., a handheld computer, a personal computer) configured for reading data from the communications unit. The coupling between the meter register and the reading device, sometimes referred to herein as a reader, may be a well known coupling such as optical, RS-232 or some other media.

The present invention, for example, may be practiced in combination with a meter such as the meter described in U.S. Pat. No. 5,059,896 coupled to an electronic register such as the register described in co-pending U.S. patent application Ser. No. 07/691,252, filed Apr. 25, 1992 or in U.S. Pat. No. 4,465,970, all of which are hereby incorporated, in their entirety, herein by reference.

In addition, the present invention can be utilized in connection with protocols such as the protocols described in the following documents, all of which are available from General Electric Company, 130 Main Street, Somersworth, N.H. 03878: Optocom-2 Protocol, Appendix A: UCNet Phase3, 1992; Extended Meter Reading Protocol, 12/4/92; Optocom-2 Protocol, Technical Development Reference Guide, GEI-52558, 12/91; and Standard Meter Reading Protocol, GEI-52556, 11/91, all of which are incorporated herein, in their entirety, by reference.

Figure 1:
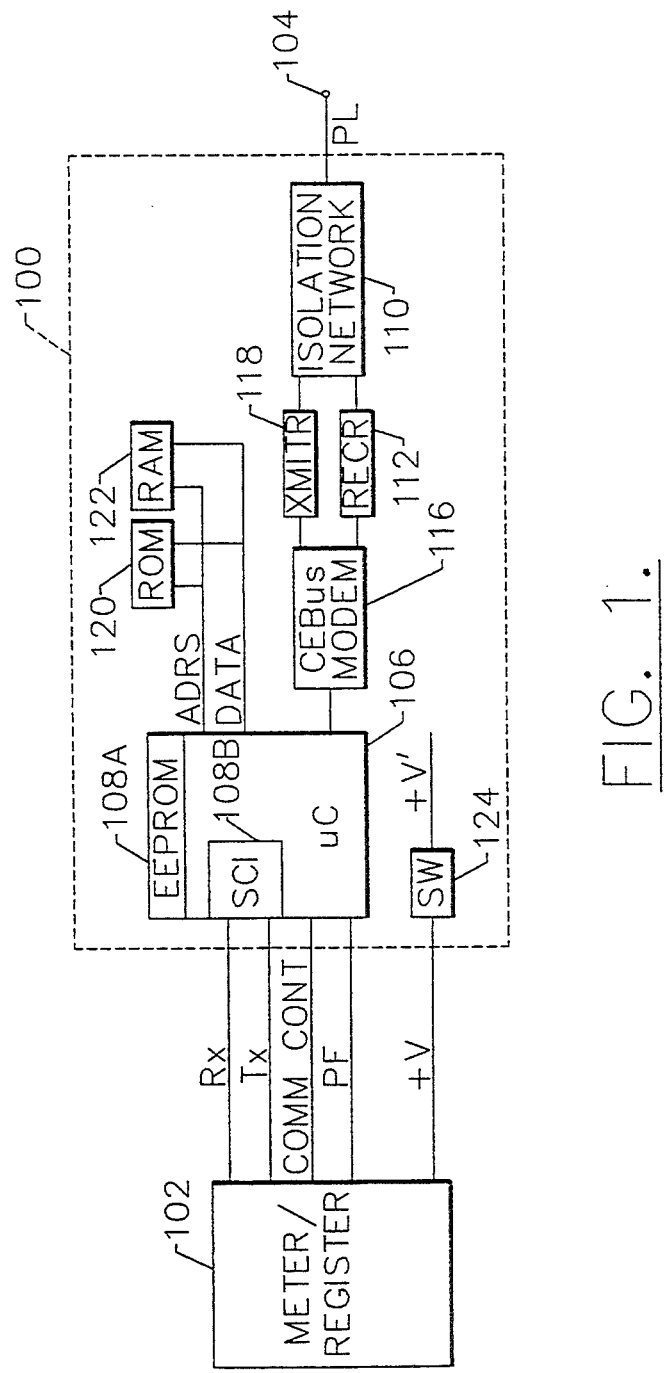
FIG. 1 is a block diagram description of one embodiment of a power line communication circuit.

Referring now to FIG. 1, a block diagram description of one embodiment of a power line communication circuit 100, sometimes referred to herein as a communications unit, coupled between a meter/register 102 and a power line 104. The communication circuit 100, for example, would be physically disposed within the meter enclosure. More particularly, the circuit 100 may be embodied in a printed circuit board disposed within the enclosure of the energy meter. The circuit 100 is shown separate from the meter/register 102 for illustration purposes only. An example of an electronic energy meter in which the circuit 100 may be disposed and coupled to is the meter commonly known as the Phase3 meter which is commercially available from General Electric Company, 130 Main Street, Somersworth, N.H. 03878.

In a first communication mode, the circuit 100 receives information transmitted over the power line 104. The information present on the power line 104 may, for example, be information sent from a communicating device disposed on a utility pole. Such communication device is coupled to the power lines disposed between the secondary side of a distribution transformer and a meter as described in U.S. Pat. Nos. 3,702,460 and 4,749,992 (relay module). The power line 104 may be one of such secondary distribution power lines.

The circuit 100 includes a micro-controller 106 which may be a Motorola 68HC11A1 Micro-controller. The micro-controller 106 includes a EEPROM 108A and a serial communications interface (SCI) 108B. The SCI 108B is utilized for communicating with the meter/register 102 via receive (Rx), transmit (Tx) and communication control (COMM CONT) lines. The circuit 100 also includes an isolation network 110 which couples to the power line 104 and blocks the 50/60 Hz line voltage present on the line 104. A receiver filter 112 serves as a filter/amplifier and removes any undesired signals from the signal output from the isolation network 110. The receiver filter 112 limits the received signal to the 100–400 kHz band and biases the signal for the CEBus modem 116. The modem 116 may be the Intellon SSM10CE spread spectrum power line communication microchip. A transmitter filter 118 operates in the same manner as the receiver filter 112 except that the transmitter filter 118 is for signals to be placed on the power line 104.

The circuit 100 also includes a ROM 120 and a RAM 122 coupled to the micro-controller 106 via address (ADRS) and data (DATA) lines, and a power switch 124. Power for the circuit 100 is provided from a voltage +V' coupled through the switch 124 from a voltage +V provided by the meter/register 102.

Briefly, in operation, data is transmitted and received over the power line 104 in CEBus defined "packets" which may consist of a preamble, a packet body, and a CRC code. Further details regarding CEBus operations are provided hereinafter. When an in-band signal is received, the CEBus modem 116 demodulates the signal and after recognizing the preamble, alerts the micro-controller 106 of an incoming message. When the packet body is received and demodulated, the modem 116 transfers the body as serial data to the micro-controller 106 in 8-bit bytes. The micro-controller 106, through its programmed operational code stored in the ROM 120, accepts the input request from the modem 116 and performs the requested task. The task could involve assembling data from the RAM 122 or from the meter/register 102. The micro-controller 106 communicates with the meter/register 102 via the SCI 108B which permits asynchronous data interchange. The data is then fed to the modem 116 for transmission through the transmitter filter 118 and isolation network 110 to the power line 104.

The micro-controller 106, alternatively, through its programmed operational code stored in the ROM 120, accepts an input request from the reader device via the SCI 108B and performs the requested task. The task could involve assembling data from the RAM 122. The response is transmitted back to the reader through the SCI.

A power fail line (PF) output from the meter/register 102 also is provided to the micro-controller 106. If the meter/register 102 indicates an impending power outage, the micro-controller 116 stops any data transfer on the power line 104, stores all necessary parameters in the internal EEPROM 108A, and then opens the power switch 124. In this manner, data can be saved.

Further details regarding the Motorola 68HC11A1 micro-controller are set forth in the M68HC11 Reference Manual, Revision 3, 1991, available from the Motorola Literature Distribution Center, P.O. Box 20912, Phoenix, Ariz., 20912. Further details regarding the Intellon SSM10CE spread spectrum power line communication microchip are set forth in the Intellon Advance Information: SSC PLCE CEBus Spread Spectrum Power Line Modem available form Intellon Corporation, 5150 West Highway 40, Ocala, Fla., 34482.

Figure 2:
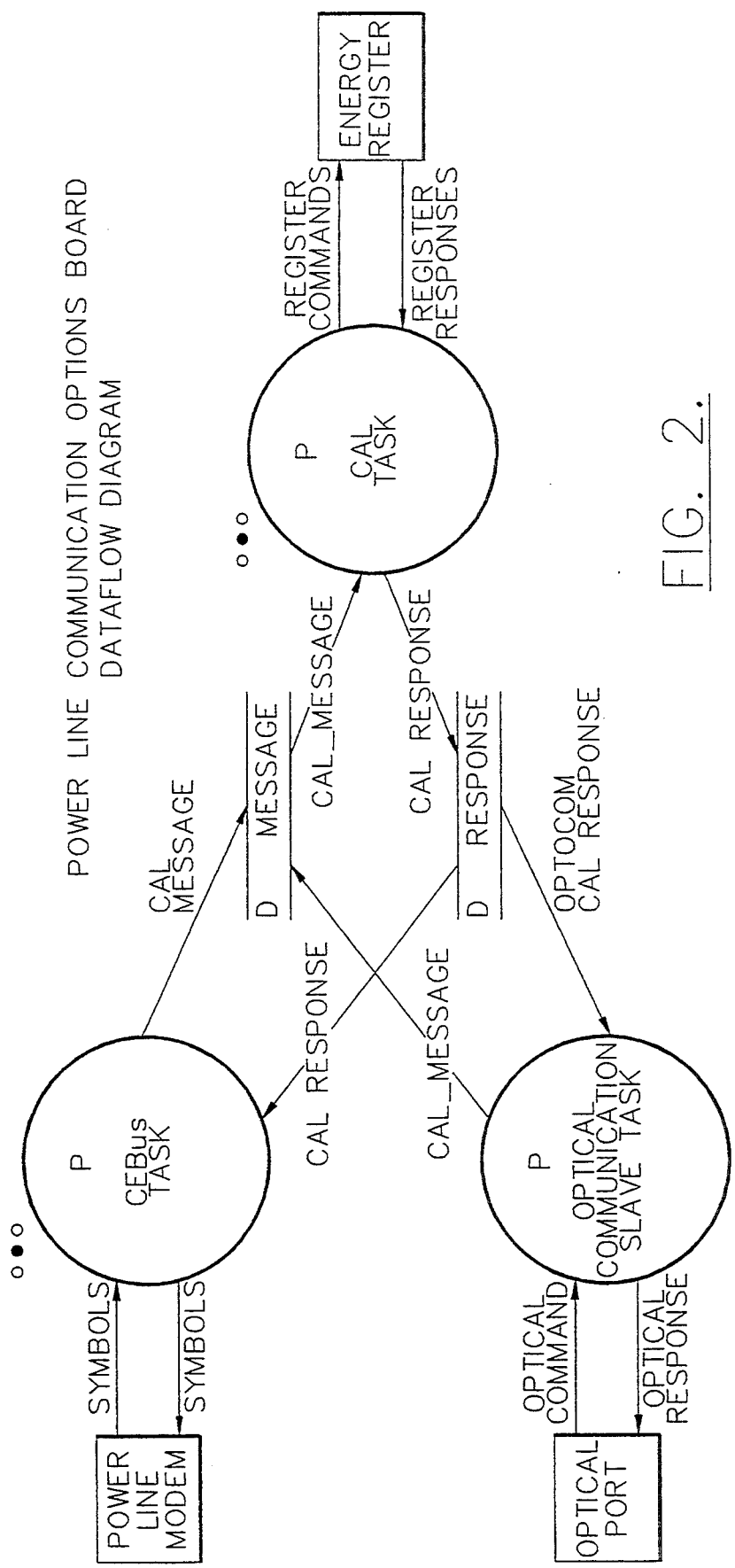
FIG. 2 is a data flow diagram for the power line communication circuit shown in FIG. 1.

Referring now to FIG. 2, a CEBus Task, CAL Task and Optical Communication Slave Task corresponding to processes performed by the processor 106 under the control of task programs stored in the ROM 120 are illustrated. The CEBus Task is associated with the Power Line Modem, the Optical Communication Slave Task is associated with the optical port of the meter, and the CAL Task is associated with the energy register of the meter. The data message/response inputs/outputs for each process are stored in the RAM 122.

In operation, and by way of example, encoded symbols from the power line modem 116 serve as input for the CEBus Task. The CAL Message output by the CEBus Task process is provided as input for the CAL Task process. As illustrated in FIG. 2, Register Commands and Register Responses may be provided from/to the CAL Task process.

In operation, and by way of another example, asynchronous ASCII characters from the SCI 108B serve as input for the Optical Communication Slave Task. The CAL message output by the optical communication slave task is provided as input for the CAL task process.

The CAL Response is output to the RAM 122 and may be communicated externally via an optical communications port through the Optical Communications Slave Task or via the power line modem 116 through the CEBus Task. Further details with respect to the contents of each layer and the purpose for the CAL and CEBus architectures are available from the CEBus Committee of the Electronics Industries Association (EIA), 2001 Pennsylvania Avenue, N.W., Washington, D.C., 20006.

Figure 3A:
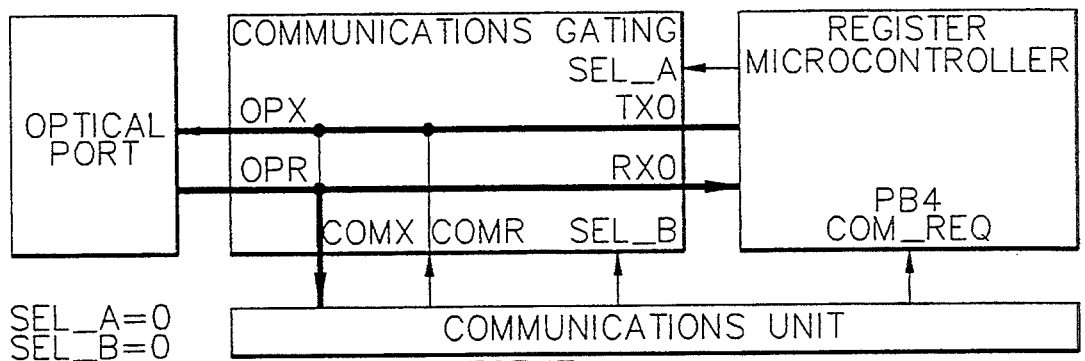
FIGS. 3A-C are block diagrams illustrating gating logic between a meter register, a communications logic means and an optical port.
Figure 3B:
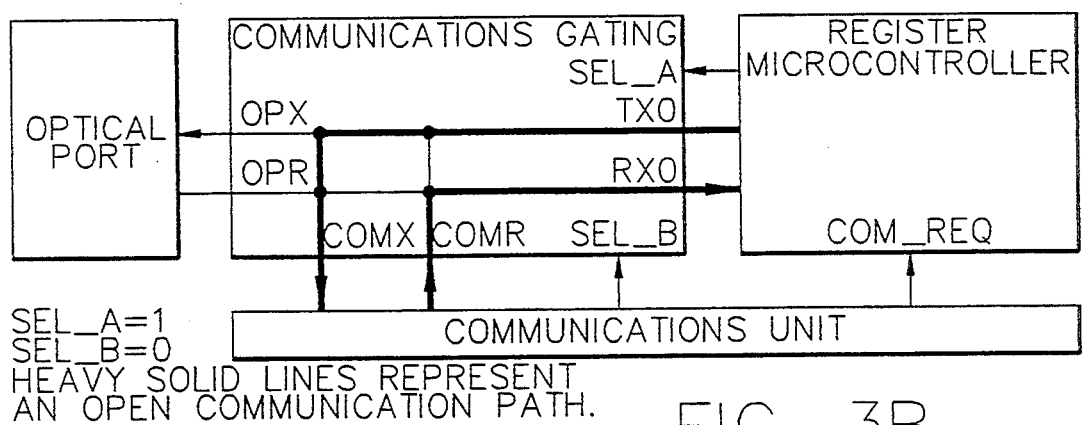
Figure 3C:
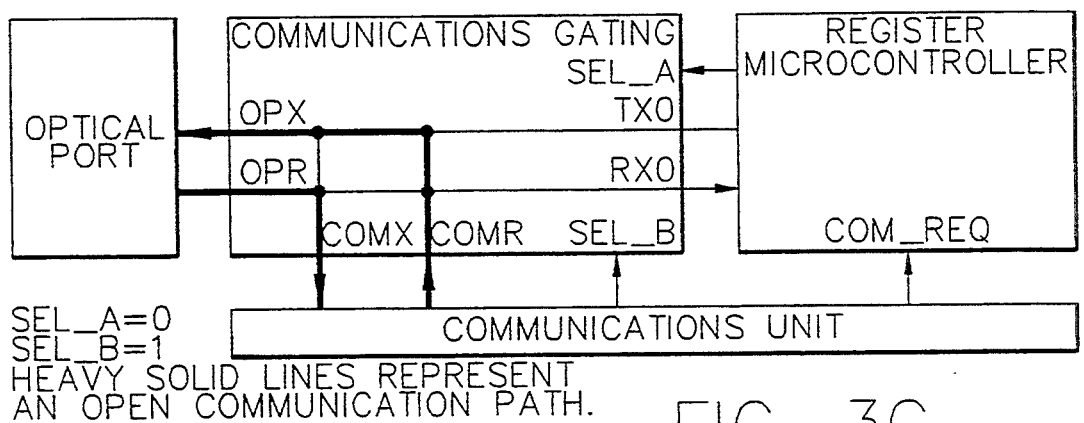

The foregoing data flow diagrams are provided herein primarily for background purposes to facilitate an understanding of one context in which the present invention may be utilized. It is contemplated, of course, that the present invention can be utilized in many other contexts. Referring now to FIGS. 3A–C, the communication path between an optical port, a register microcontroller, an alternate communication port such as the communications unit illustrated in FIGS. 2 and 3, and a communications gating unit are illustrated. More particularly, FIG. 3A illustrates the communication path when the alternate communication port is in the standby mode. More particularly, the alternate port receives signals transmitted through the optical port to the register microcontroller but the alternate port does not detect communication from the register microcontroller to the optical port.

FIG. 3B illustrates the configuration when the alternate communications port is communicating with the register microcontroller. Particularly, no signals are passed to the optical port. FIG. 3C illustrates the configuration when the optical port and the alternate communications port are communicating. In this mode, no communications are passed to the register microcontroller. The configuration illustrated in FIG. 3C is the configuration in which the present invention is practiced.

Figure 5B:
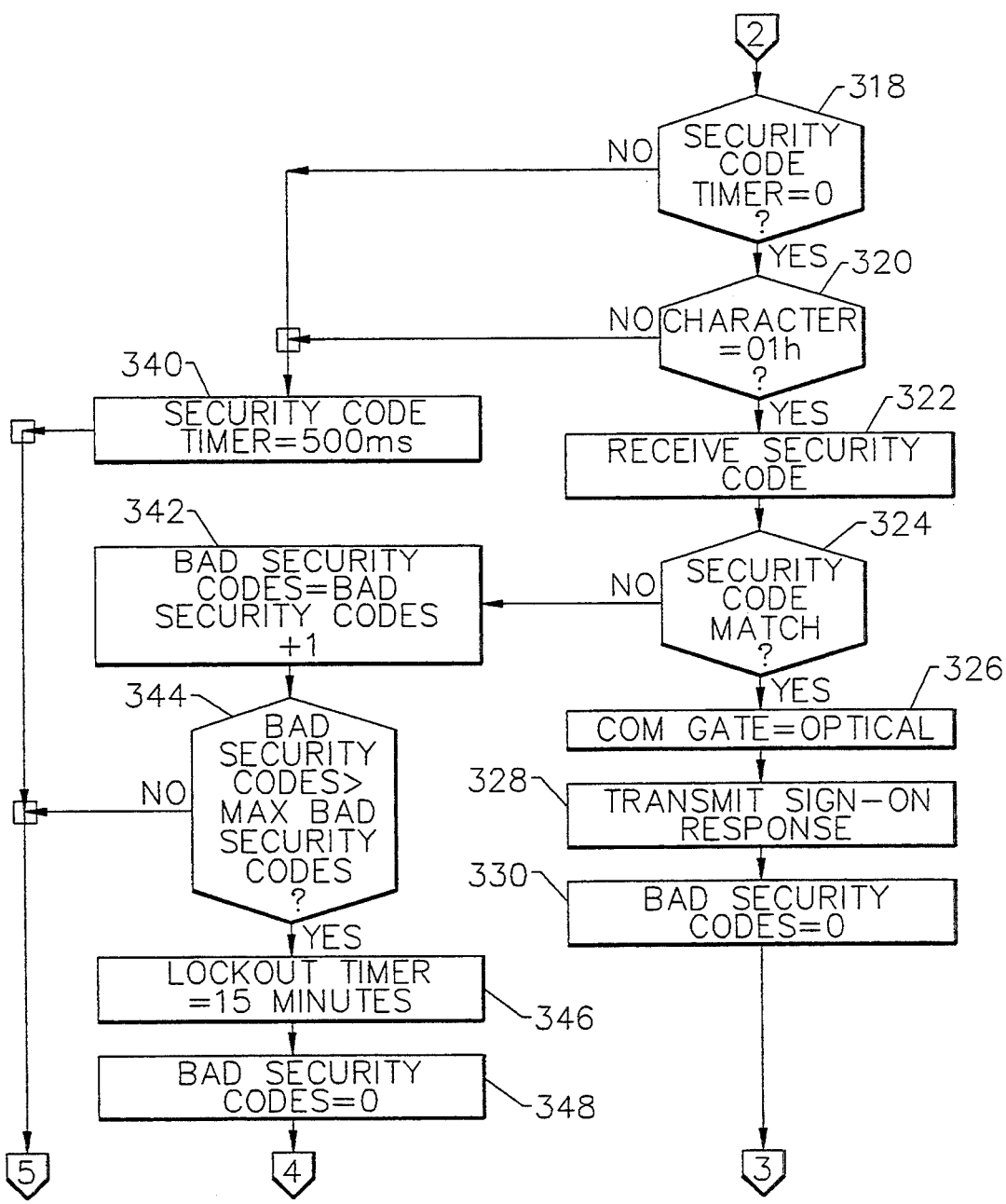
Figure 5C:
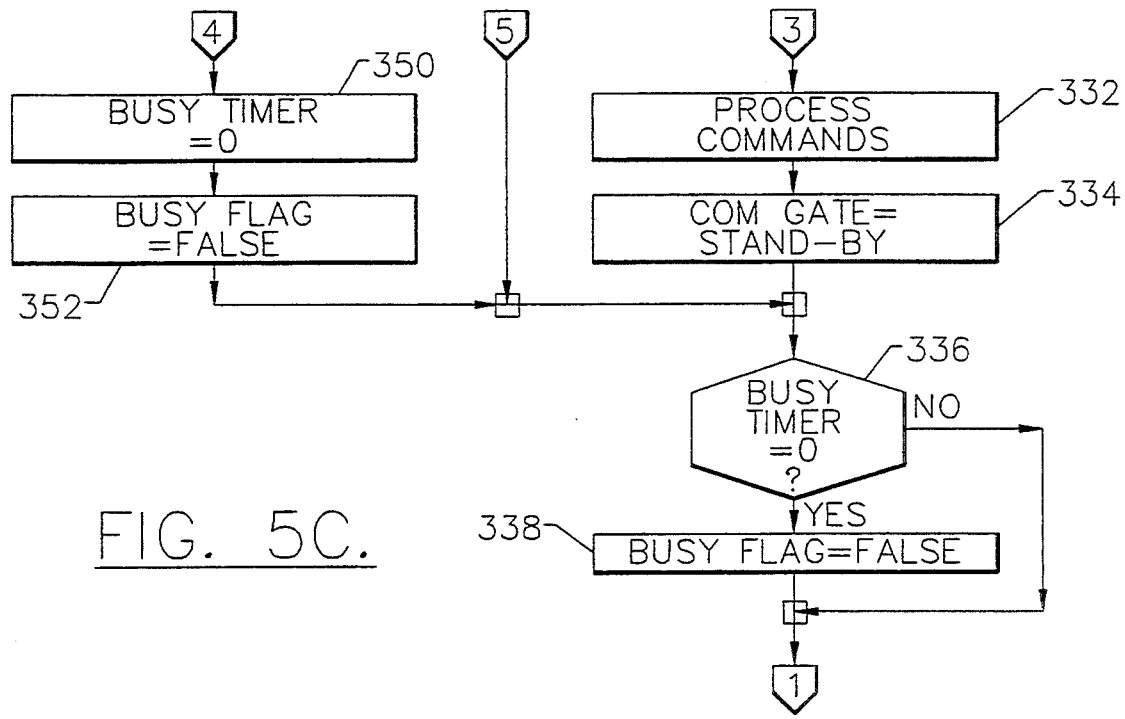
Figure 6:
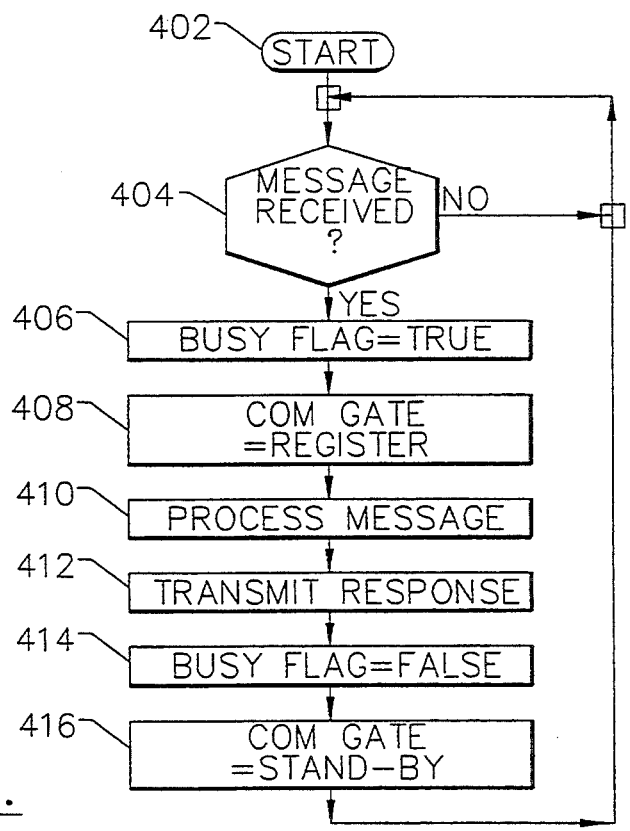
FIG. 6 is a flow chart illustrating one embodiment of a sequence of process steps to be executed, in accordance with the present invention, by a communication unit forming part of an energy meter.

The algorithms illustrated in FIGS. 4, 5 and 6 are interactive and depend on inputs/outputs being transmitted from one to the other. Referring now in detail to FIGS. 4, an algorithm to be executed by a reader device 130, sometimes referred to herein as a reader, such as the reader device available from MicroPalm Computers, Inc., 13773-500 ICOT Boulevard, Clearwater, Fla. 34620 is illustrated. The reader device, for example, would be coupled to an optical coupler, such as the SmartCoupler—2 device, which includes an optical probe. In addition to providing optical coupling, the SmartCoupler—2 device may perform protocol conversion so that commands and data transmitted between the reader and the meter register are properly formatted. The SmartCoupler—2 device is commercially available from General Electric Company, 130 Main Street, Somersworth, N.H. 03878.

Particularly, FIG. 4 is a flow chart describing in detail the sequence of process steps to be followed by a reader when initiating a communications session with the communications unit. Once operations start (202), the input buffer of the reader is cleared (204). The reader then selects the first security code in a list (206) of codes, which list is prestored in the reader memory. For example, each utility is provided with a list of unique 80-bit security codes to use with electronic registers. These codes would be stored in the reader memory.

After selection of a code, the reader then waits 500 milliseconds (208) to allow any active communications over the optical port to time out. It then transmits a hex 01 (210) to indicate that it is signing onto the communications unit. The hex 01 is followed by the 80-bit security code (212). The reader then begins to receive the sign-on response from the communications unit (214). If a valid sign-on response is received within a given time period (216), a communication session has been successfully initiated and the reader can send other commands to the communications unit. The communication session is terminated by sending a sign-off command.

If a valid sign-on response is not received within the given timer period or a NAK1 (negative acknowledgment) is received (216), a determination is made if there are more security codes in the list (218). If there are more security codes, the reader selects the next security code (220) and repeats steps 208–216. This process continues until the reader receives a valid sign-on response (216) or all of the security codes in the list have been tried (218) and failed. FIGS. 5A–C are a flow chart illustrating how the communications unit detects a valid security code without interpreting data intended for the register as a security code and how the communications unit avoids receiving remote communications while a reader is communicating with the register or the communications unit.

For communications between the communications unit and a reader through the optical port, and in general, the communications unit receives data from a reader with the optical port gating in the standby mode (FIG. 3A). Once it is determined that the communications unit is to communicate exclusively with the reader, the communications unit switches the gating so that communications with the register is blocked (FIG. 3C) by setting the SEL_B to 1. The communication unit then transmits and receives characters to and from the reader by utilizing the SCI 108B. A character is transmitted by writing the character to the SCDR Tx buffer. Before the character is written to the SCDR Tx buffer, the SCSR TDRE bit should be checked to ensure that the previous character has been transmitted. The communications unit may need to wait for the TDRE bit to clear. To receive a character from the reader, the communication unit first checks whether a character is available. A character is available if the SCSR RDRF bit is set to 1. If a character is available, the character is received by reading it from the SCDR Rx buffer. When communication is complete, the communication device should switch the optical port gating back to standby mode (FIG. 3A) by setting SEL_B to 0.

Referring now to FIG. 5A, operations begin (302) and then variables of the communication unit are initialized for the process (304). The busy flag is set to FALSE. The busy flag is used to indicate that there is optical communication and remote communication should not be received. For CEBus type communications, this means that if a packet is received while the busy flag is set, the data link layer will transmit a "failure" signal to the originating device to indicate that the meter is not accepting the packet. The packet will not be copied to the network layer. The busy timer is set to zero. The busy timer is used to count the minimum amount of time the communications unit is to remain in the busy state to allow a reader to complete its duties uninterrupted. The security code timer is set to zero. The security code timer is used to count the minimum amount of time between the last character received and the hex 01 which precedes the security code. The lockout timer is set to zero. The lockout timer is used to prevent intruders from breaking the security code programmed into the communication unit. Particularly, upon initiating operation of the lockout timer, the communication unit will not accept a security code for fifteen minutes. The number of bad security codes is initialized to zero and the receive buffer for optical communication is cleared.

Once the variables are initialized, it is determined whether the lockout timer is running (306). If the lockout timer does not equal zero, a loop is entered. A value of zero indicates that the timer has expired. Once the lockout timer expires, if a character is available from the optical port (308), the character is received (310) and the SCI status is checked (312). If there were no errors receiving the character (e.g., framing or parity), the busy flag is set to TRUE (314) to block out remote communication to the communication unit and the busy timer is set to three minutes (316).

Referring now to FIG. 5B, the security code timer is checked to see if it has expired (318). If the security code timer has expired, the minimum amount of time to wait before looking for a security code has been met. The character is then checked to see if it is a hex 01 (320). If the character is a hex 01, the 80-bit security code is received (322).

If a valid 80-bit security code is received, it is compared first against a programming and then a read-only security code (324). If the security code received matches either the programming or read-only security code, the communication gating is switched to "optical" (FIG. 3C) to block out the register (326). The sign-on response is transmitted (328) and the number of bad security codes received is set to zero (330).

Referring to FIG. 5C, the communications unit then goes into a state where it receives commands and processes the commands (332). The communication unit continues processing commands until a sign-off command is received. The communication gating is then switched back to stand by (334) (FIG. 3A). If the busy timer has expired (336), the busy flag is set to FALSE (338) to indicate that remote communication can now be received and the process continues at step (306).

Referring to FIG. 5A, if the lockout timer is active (306), the process loops until the lockout timer expires. If no character is available (308), the process skips to step (336). If a character is received with a bad status from the SCI (312), the character is thrown away and the process continues at step (336). Invalid characters are not considered optical traffic. Ambient light may occasionally generate invalid characters.

If the security code timer has not expired (318) or if the first character after the timer has expired in not a hex 01 (320), the security code timer is set to 500 ms (340) and the process continues at step (336).

If the security code received does not match either the programming or the read-only security code (324), the number of bad security codes received is incremented (342). Note that the NAK1 is not transmitted. The register will transmit the NAK1 in response to an unrecognized security code. A determination is made if the maximum number of invalid security codes has been exceeded (344). If the limit has been exceeded, the lockout timer is set to fifteen minutes (346). The number of bad security codes is set to zero (348). The busy timer is set to zero (350) and the busy flag is set to FALSE (352).

FIG. 6 is a flow chart illustrating how the communication unit locks out a reader while it is processing a message. The process begins at (402) and then a determination is made if a message has been received (404). A flag is set by the message transfer sub-layer if a message has arrived. If a message has arrived, the busy flag is set to TRUE (406) to indicate that no more packets are to be received by the data link layer. The communication gating logic is switched to "register" (408) (FIG. 3B) to allow direct communication with the register and to lock out reader communication. The message is processed (410) and the response is transmitted (412). The busy flag is set to FALSE (414) to allow packets to be accepted, and the communication gating logic is switched to stand by (416) (FIG. 3A) to look for reader activity. The process is now complete and returns to step (404) to wait for another message to process.

The foregoing describes, in detail, the present security code algorithm. By using the present invention, a communication unit can distinguish between a code for the register or a code for itself.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. Apparatus, comprising:
   metering means comprising register means and communication unit means, said metering means further comprising communication port means coupled to said register means and said communication unit means, said communication unit means comprising:
   means for receiving a message from said communications port means, the message containing a security code,
   means for determining whether the message is for said register means, and
   means, responsive to said determining means, for performing operations on the message if the message is not for said register means; and
   reader means comprising a communication probe which mates with said communication port means, said reader means comprising:
   means for initiating communication with said communication unit means via said communication port means, and
   means for transmitting the message containing the security code to said communication port means.

2. Apparatus in accordance with claim 1 wherein said communication port means comprises an optical port.

3. Apparatus in accordance with claim 1 wherein said communication port means comprises an RS-232 port.

4. Apparatus in accordance with claim 1 wherein said communication unit means further comprises means for determining whether a pre-determined number of invalid security codes have been transmitted to said communication unit means, and if the number of invalid security codes equals the pre-determined number, means for preventing communications with said metering means for a pre-determined length of time.

5. Apparatus in accordance with claim 1 wherein said communication unit means further comprises power line communication means for communicating on a power line and said communication means comprising means for preventing communication on the power line for a pre-determined length of time upon receipt of a valid security code from said communication port means.

6. Apparatus in accordance with claim 1 wherein when said communication unit means receives a valid security code, communications between said register means and said communication port means is blocked.

7. Apparatus in accordance with claim 1 wherein said reader means further comprises means for determining whether a response to the message has been transmitted to said communication port means by said communication unit means, and if no such response has been transmitted, then transmitting another message containing another security code to said communication port means.

8. Metering apparatus, comprising:
   register means, communication unit means, and communication port means coupled to said register means and said communication unit means, said communication unit means comprising:
   means for receiving a message from an external source via said communications port means, the message containing a security code,
   means for determining whether the message is for said register means, and
   means, responsive to said determining means, for performing operations on the message if the message is not for said register means.

9. Apparatus in accordance with claim 8 wherein said communication port means comprises an optical port.

10. Apparatus in accordance with claim 8 wherein said communication port means comprises an RS-232 port.

11. Apparatus in accordance with claim 8 wherein said communication unit means further comprises means for determining whether a pre-determined number of invalid security codes have been transmitted to said communication unit means, and if the number of invalid security codes equals the pre-determined number, means for preventing communications for a pre-determined length of time.

12. Apparatus in accordance with claim 8 wherein said communication unit means further comprises power line communication means for communicating on a power line and said communication means comprises means for preventing communication on the power line for a pre-determined length of time upon receipt of a valid security code from said communication port means.

13. Apparatus in accordance with claim 8 wherein when said communication unit means receives a valid security code, communications between said register means and said communication port means is blocked.

14. Apparatus in accordance with claim 8 further comprising reader means comprising a communication probe which mates with said communication port means, said reader means further comprising means for initiating communication with said communication unit means via said communication port means, and means for transmitting the message containing the security code to said communication port means.

15. Apparatus in accordance with claim 14 wherein said reader means further comprises means for determining whether a response to the message has been transmitted to said communication port means by said communication unit means, and if no such response has been transmitted, then transmitting another message containing another security code to said communication port means.

* * * * *